United States Patent [19]

Blanton, Jr. et al.

[11] 4,071,436
[45] Jan. 31, 1978

[54] PROCESS FOR REMOVING SULPHUR FROM A GAS

[75] Inventors: William A. Blanton, Jr.; Robert L. Flanders, both of San Anselmo, Calif.

[73] Assignee: Chevron Research Company, San Francisco, Calif.

[21] Appl. No.: 666,115

[22] Filed: Mar. 11, 1976

[51] Int. Cl.² .................... C10G 11/02; C01B 17/16; C01B 17/00

[52] U.S. Cl. .................................. 208/120; 208/113; 423/244; 423/563

[58] Field of Search ............... 423/556, 561, 563, 564, 423/650, 651, 655, 566, 244; 208/120

[56] References Cited

U.S. PATENT DOCUMENTS

| Re. 27,639 | 1/1973 | Thomas | 260/672 T |
|---|---|---|---|
| 2,422,172 | 6/1947 | Smith et al. | 423/564 |
| 2,992,884 | 7/1961 | Bienstock et al. | 423/563 |
| 3,141,735 | 7/1964 | Young | 423/539 |
| 3,551,093 | 12/1970 | Myers et al. | 423/244 |
| 3,630,943 | 12/1971 | Myers et al. | 423/556 |
| 3,699,037 | 10/1972 | Annesser et al. | 423/244 |
| 3,755,535 | 8/1973 | Naber | 423/244 |
| 3,835,031 | 9/1974 | Bertolacini | 423/539 |
| 3,948,809 | 4/1976 | Norman et al. | 423/244 |
| 3,949,684 | 4/1976 | Copeland | 423/556 |

*Primary Examiner*—Earl C. Thomas
*Assistant Examiner*—Gary P. Straub
*Attorney, Agent, or Firm*—D. A. Newell; R. H. Davies; W. D. Reese

[57] ABSTRACT

Sulfur oxides are removed from a gas and the sulfur is converted to hydrogen sulfide by the steps of: (1) reacting sulfur oxides in the gas with alumina to form a solid sulfur-containing compound and remove sulfur oxides from the gas; and (2) contacting the solid compound resulting from step (1) with a hydrocarbon at a temperature of about 800°–1300° F and reacting the solid sulfur-containing compound with components of the hydrocarbon to form hydrogen sulfide.

1 Claim, 2 Drawing Figures

PROCESS FOR REMOVING SULPHUR FROM A GAS

BACKGROUND OF THE INVENTION

The present invention relates to a process for removing sulfur from a sulfur-containing gas using a particulate solid which contains alumina in a form which reacts with sulfur compounds in the gas to form a solid compound in the particulate solid, and forming hydrogen sulfide using sulfur in the solid compound. In one aspect, the invention relates to removal of sulfur compounds from fluid catalytic cracking regenerator flue gas. In another aspect, the invention relates to removal of gaseous sulfur compounds from stack gases and tail gases formed during hydrocarbonaceous fuel combustion or gas treating operations, and forming hydrogen sulfide using the sulfur.

The desirability of removing sulfur compounds from various sulfur-containing gases is well known. This is particularly the case when it is desired to discharge such gases into the atmosphere. Concern with atmospheric pollution has imposed limits on the amount of gaseous sulfur compounds which can be discharged directly into the atmosphere in flue gases, tail gases and stack gases. For example, sulfur-containing gases result from such operations as fossil fuel combustion, Claus-type gas desulfurization, and regeneration of catalysts employed in petroleum refineries. Waste gases from such operations are often passed into the atmosphere. It is thus desirable to keep the sulfur content of these gases at a low level. Many of the methods previously proposed for reducing and controlling the amount of sulfur in such gases are uneconomical for the intended use. Such methods can substantially increase the cost of energy obtained from fossil fuel combustion and the cost of petroleum products produced in refineries in which sulfur emission controls are necessary.

Modern catalytic hydrocarbon cracking systems use a moving bed or a fluidized bed of a particular catalyst. The cracking catalyst is subjected to a continuous cyclic cracking reaction and catalyst regeneration procedure. In a fluidized catalytic cracking (FCC) system, a stream of hydrocarbon feed is contacted with fluidized catalyst particles in a hydrocarbon cracking zone, or reaction zone, usually at a temperature of about 800°–1100° F. The reactions of hydrocarbons in the hydrocarbon stream at this temperature result in deposition of carbonaceous coke on the catalyst particles. The resulting cracked, or processed, hydrocarbon stream is thereafter separated from the coked catalyst and withdrawn from the cracking conversion zone. The coked catalyst is then stripped of volatiles and passed to a catalyst regeneration zone. In the catalyst regeneration zone, the coked catalyst is contacted with a gas containing a controlled amount of molecular oxygen to burn off a desired portion of coke from the catalyst and simultaneously to heat the catalyst to a high temperature desired when the catalyst is again contacted with the hydrocarbon stream in the cracking zone. The catalyst is then returned to the cracking zone, where it vaporizes the hydrocarbons and catalyzes hydrocarbon cracking. The flue gas formed in the catalyst regeneration zone, which contains the combustion products produced during burning of the coke, is separately removed from the regeneration zone. This flue gas, which may be treated to remove particulates and carbon monoxide from it, is normally passed into the atmosphere.

The conventional type of FCC regeneration operation currently employed in most FCC systems is an incomplete combustion mode of operation. In such conventional systems, referred to herein as standard regeneration systems, a substantial amount of coke carbon is left on the catalyst particles when they are removed from the FCC regeneration zone and recycled to the FCC conversion zone. Typically, regenerated catalyst removed from an FCC regeneration zone contains a substantial amount of coke carbon, i.e., more than 0.2 weight percent cabon, and usually contains about 0.25 weight percent to about 0.45 weight percent carbon when a standard regeneration mode of operation is used. The flue gas removed from the FCC regeneration zone in a standard, incomplete regeneration operation is characterized by a relatively high carbon monoxide/carbon dioxide concentration ratio. There is a reducing atmosphere in much of the regeneration zone because of the presence of substantial amounts of unburned coke carbon and carbon monoxide in standard regeneration systems.

Removal of substantially all the coke carbon from FCC cracking catalyst during the regeneration operation has been difficult. Until recently, there has been little incentive to attempt to remove substantially all the coke carbon from the regenerated catalyst, i.e., to reduce the carbon content of regenerated catalyst below 0.2 weight percent, and preferably 0.1 weight percent, since even a fairly high carbon content has had little adverse effect on the activity and selectivity of amorphous silica-alumina catalysts previously used. Most of the FCC cracking catalysts now used, however, contain zeolites, or molecular sieves. The zeolite-containing catalysts have usually been found to have relatively higher activity and selectivity when their coke carbon content is relatively lower. An incentive has thus risen for attempting to reduce the coke content of regenerated catalyst to a very low level, below 0.2 weight percent.

Several methods have been recently suggested for removing substantially all the coke carbon from FCC cracking catalyst during regeneration. FCC regeneration systems using these methods normally involve complete combustion to carbon dioxide of substantially all the carbon in the coke in the catalyst within the FCC regeneration zone. Such systems are therefore referred to herein as complete combustion regeneration systems. Among the procedures suggested for use in complete combustion type FCC regeneration systems are (a) increasing the amount of oxygen introduced into the regeneration zone relative to standard regeneration, (b) increasing the average operating temperature in the regeneration zone, and (c) including various coke carbon oxidation promoters, such as Group VIII noble metals, in FCC cracking catalyst compositions to promote coke burnoff in the regenerator. Various solutions have also been suggested for the problem of afterburning of carbon monoxide in FCC regenerators, e.g., addition of extraneous combustibles or use of water or heat accepting solids to absorb carbon monoxide combustion heat from the flue gas.

The hydrocarbon feeds processed in commercial FCC units normally contain sulfur, herein termed feed sulfur. It has been found that about 2–10% or more of the feed sulfur in a hydrocarbon stream processed in an FCC system is invariably transferred from the hydrocarbon stream to the cracking catalyst, becoming part of the coke formed on the catalyst particles within the FCC cracking or conversion zone. This sulfur, herein termed coke sulfur, is eventually removed from the conversion zone on the coked catalyst which is sent to the FCC regenerator. Accordingly, about 2-10% or more of the feed sulfur is continuously passed from the conversion zone into the catalyst regeneration zone with the coked catalyst in an FCC unit.

In an FCC catalyst regenerator, sulfur contained in the coke is burned, along with the coke carbon, forming primarily gaseous sulfur dioxide and sulfur trioxide. These gaseous sulfur compounds become part of the flue gas produced by coke combustion and are conventionally removed from the regenerator in the flue gas.

Most of the feed sulfur is converted either to normally gaseous sulfur compounds, e.g., hydrogen sulfide, and carbon oxysulfide, or to gasoline boiling range organic sulfur compounds, in the FCC cracking zone. These fluid sulfur compounds are carried along in the processed hydrocarbon stream. About 90% or more of the feed sulfur charged to the cracking zone in FCC units is thereby continuously removed from the cracking zone in the stream of effluent processed hydrocarbons with 40-60% of this effluent sulfur being hydrogen sulfide. For this reason, provisions are conventionally made in petroleum refineries to recover hydrogen sulfide from the processed hydrocarbon effluent. Usually, a very-low-molecular-weight off-gas vapor stream is separated from the liquid hydrocarbons in a gas recovery unit and is treated, as by scrubbing it with an amine solution, in order to remove the hydrogen sulfide from the off-gas. Removal of sulfur compounds such as hydrogen sulfide from the processed hydrocarbon effluent from an FCC unit cracking zone is relatively simple and inexpensive, especially as compared to removal of sulfur oxides from an FCC regenerator flue gas by conventional methods.

It has been suggested to reduce the amount of sulfur in FCC regenerator flue gas in commercial units, when necessary, by either: (1) desulfurizing the hydrocarbon FCC feed in a separate desulfurization unit to reduce the amount of feed sulfur prior to processing the feed in the FCC unit; or (2) desulfurizing the regenerator flue gas itself, by a conventional flue gas desulfurization procedure, after the flue gas has been removed from the FCC regenerator. Both of the foregoing alternatives require elaborate additional processing operations and necessitate substantial additional capital and utilities expenses in a petroleum refinery. For this reason, the cost of processing high-sulfur feedstocks in FCC units is high. Yet, many of the petroleum stocks currently available for processing in FCC units have a high sulfur content. Thus, the inclusion of expensive extraneous equipment and procedures in refinery operations to reduce the amount of sulfur in the flue gas removed from an FCC unit is a major problem in the FCC art. Such additional extraneous procedures could be at least partially obviated if that part of the feed sulfur which is conventionally removed from the FCC regenerator as gaseous sulfur compounds in the flue gas could instead be removed from the FCC unit reactor as hydrogen sulfide along with the processed hydrocarbons. This portion of feed sulfur would then become simply a small addition to the much larger amount of feed sulfur already unavoidably present, as hydrogen sulfide and organic sulfur, in the stream of processed hydrocarbons. The small added expense, if any, of removing even as much as 5-15% more hydrogen sulfide from FCC reactor off-gas using already available hydrogen sulfide removal systems would be substantially less than the expense which would be incurred if separate feed desulfurization or flue gas desulfurization operation were instead used to control the amount of sulfur in the flue gas. Most, if not all, FCC reactor off-gas hydrogen sulfide recovery systems used with present commercial FCC units already have the capacity to remove additional hydrogen sulfide from the off-gas. Present off-gas hydrogen sulfide removal facilities could thus handle the additional hydrogen sulfide which would be added to the off-gas if feed sulfur charged to the FCC system were substantially all removed from the system as hydrogen sulfide in the FCC reactor off-gas, rather than having a portion of feed sulfur removed from the unit in the FCC regenerator flue gas. It would accordingly be desirable to direct substantially all feed sulfur into the processed hydrocarbon removal pathway from the reactor in order to reduce the amount of sulfur in the FCC regenerator flue gas, rather than either: (1) desulfurizing the hydrocarbon feed prior to charging it to the FCC conversion zone, or (2) subsequently desulfurizing the regenerator flue gas after it is removed from the FCC regenerator.

Alumina has been a component of many FCC and other cracking catalysts, but primarily in intimate chemical combination with silica. Alumina itself has low acidity and is undesirable for use as a cracking catalyst. As a cracking catalyst, alumina is nonselective, i.e., the cracked hydrocarbon products recovered from an FCC or other cracking unit using an alumina catalyst would not be the desired valuable products, but would include, for example, relatively large amounts of light paraffin gases. Silica, as such, is also low in acidity and is a poor cracking catalyst. Physical mixtures of alumina and silica have likewise been found to be low in acidity and are poor cracking catalysts. On the other hand, chemically combined alumina and silica, e.g., alumina-silica cogels and molecular sieves, or zeolites, have been found to be quite high in acidity, and are used in most, if not all, present commercial FCC catalysts.

SUMMARY OF THE INVENTION

In a broad embodiment, the present invention relates to a process for forming hydrogen sulfide which comprises the steps of: (a) reacting sulfur trioxide, or sulfur dioxide and oxygen, with alumina at a temperature in the range from 1000° F to 1500° F to form at least one solid compound including sulfur atoms and aluminum atoms; and (b) forming hydrogen sulfide from the solid compound and a hydrocarbon by contacting the solid compound and the hydrocarbon at a temperature in the range from 800° F to 1300° F.

In a more limited embodiment employed in a fluid catalyst cracking process including the steps of (a) cracking a sulfur-containing hydrocarbon stream in contact with a fluidized bed of a particulate cracking catalyst in a cracking zone at cracking conditions including a temperature in the range from 800° F to 1300° F, whereby sulfur-containing coke is deposited on the catalyst, and removing said hydrocarbon stream from the cracking zone, (b) passing coke-containing catalyst from the cracking zone and an oxygen-containing gas into a cracking catalyst regeneration zone, burning off the sulfur-containing coke from the catalyst in the regeneration zone at a temperature in the range from 1000° F to 1500° F to form a flue gas containing sulfur oxides, and removing the flue gas from the catalyst regeneration zone; and (c) returning the resulting coke-depleted catalyst from the catalyst regeneration zone to contact with the hydrocarbon stream in the cracking zone; the present invention relates to a method for decreasing the amount of sulfur oxides in the flue gas which comprises the steps of: (1) reacting sulfur oxides in the flue gas with alumina contained in a particulate solid other than the catalyst, in the regeneration zone, to form at least one solid compound including sulfur atoms and aluminum atoms in the particulate solid, and removing the flue gas from the regeneration zone; and (2) forming hydrogen sulfide from the solid compound and the hydrocarbon stream by contacting the particulate solid with the hydrocarbon stream in the cracking zone in admixture with the cracking catalyst, and removing hydrogen sulfide from the cracking zone in the hydrocarbon stream.

In a further limited embodiment employed in a fluid catalyst cracking process including the steps of (a) cracking a sulfur-containing hydrocarbon stream in contact with a fluidized bed of a particulate cracking catalyst in a cracking zone at cracking conditions including a temperature in the range from 800° F to 1300° F whereby sulfur-containing coke is deposited on the catalyst, and removing the hydrocarbon stream from the cracking zone; (b) passing coke-containing catalyst from the cracking zone and an oxygen-containing gas into a cracking catalyst regeneration zone, burning off substantially all of the sulfur-containing coke from the catalyst in the regeneration zone at a temperature in the range from 1000° F to 1500° F to form a flue gas containing sulfur oxides, and removing the flue gas from the catalyst regeneration zone; and (c) returning the resulting coke-depleted catalyst from the catalyst regeneration zone to contact with the hydrocarbon stream in the cracking zone; the present invention relates to a method for decreasing the amount of sulfur oxides in the flue gas which comprises the steps of: (1) including about 10 ppm, by weight, to about 1.0 weight percent reactive alumina in the particulate cracking catalyst; (2) passing sufficient oxygen into the regeneration zone in the oxygen-containing gas to react with substantially all the carbon in the coke-containing catalyst in the regeneration zone to form carbon dioxide; (3) burning off sufficient coke from the catalyst in the regeneration zone to provide an average carbon content of less than 0.2 weight percent in the coke depleted catalyst; (4) reacting reactive alumina in the coke depleted catalyst with sulfur oxides in the flue gas in the regeneration zone to form at least one solid compound including sulfur atoms and aluminum atoms in the coke-depleted catalyst; and (5) forming hydrogen sulfide from the solid compound and the hydrocarbon stream by contacting the solid compound in the coke-depleted catalyst with the hydrocarbon stream in the cracking zone, and removing hydrogen sulfide from the cracking zone in the hydrocarbon stream.

In another limited embodiment employed in a fluid catalyst cracking system including the processing steps of (a) cracking a sulfur-containing hydrocabon stream in contact with a fluidized bed of a particulate cracking catalyst in a cracking reactor having hydrocarbon and off-gas removal means, at cracking conditions including a temperature in the range from 800° F to 1300° F, whereby a hydrogen sulfide-containing off-gas is formed and sulfur-containing coke is deposited on the catalyst, and removing the resulting hydrocarbon and the off-gas from the reactor by the hydrocarbon and off-gas removal means; (b) passing coke-containing catalyst from the reactor and an oxygen-containing gas into a catalyst regenerator having flue gas removal means, burning sulfur-containing coke off the catalyst in the regenerator at a temperature in the range from 1000° F to 1500° F to form a flue gas containing at least one sulfur oxide, and removing the flue gas from the regenerator by the flue gas removal means; and (c) returning the resulting coke-depleted catalyst from the regenerator to contact with the hydrocarbon stream in the reactor; the present invention relates to a method for changing the removal pathway from the FCC system of the sulfur component of the sulfur oxide in the flue gas which comprises the steps of: (1) reacting the sulfur oxide with alumina in the regenerator to form at least one solid compound containing sulfur atoms and aluminum atoms, and removing the resulting sulfur-depleted flue gas from the regenerator by the flue gas removal means; and (2) forming hydrogen sulfide from the solid compound and the hydrocarbon stream by contacting the solid compound with the hydrocarbon stream in the reactor, and removing the resulting hydrogen sulfide from the reactor by the hydrocarbon and off-gas removal means.

In another limited embodiment employed in treating stack gases and tail gases, the present invention relates to a method for removing a sulfur oxide from a stream of a gaseous mixture of said sulfur oxide and at least one other gas selected from nitrogen, steam, carbon dioxide and molecular oxygen, which comprises the steps of: (1) reacting the sulfur oxide in said mixture with alumina contained in a particulate solid reactant in a desulfurization zone at a temperature of 1000° F to 1500° F, to form at least one solid compound containing sulfur atoms and aluminum atoms in the solid reactant and removing the resulting sulfur-depleted gas stream from the desulfurization zone; (2) forming hydrogen sulfide from the solid compound and a hydrocarbon by contacting the solid reactant with the hydrocarbon in a solid reactant regeneration zone at a temperature in the range from 800° F to 1300° F, and removing said hydrogen sulfide from the solid reactant regeneration zone; and (3) contacting the resulting solid with the gaseous mixture in the desulfurization zone.

In another embodiment, the present invention relates to a composition of matter comprising a mixture of (a) 90–99.5 weight percent of cracking catalyst particles including 85 weight percent or more of amorphous silica-alumina; and (b) 0.5–10 weight percent of alumina particles.

According to the invention, we have found that reactive alumina, which may be part of a particulate solid having other materials in addition to alumina, will react with sulfur trioxide or sulfur dioxide and oxygen to form one or more stable solid compounds having sulfur atoms and aluminum atoms therein, as a component of the particulate solid, at temperatures in the range from 1000°–1500° F. We have also found that the sulfur-containing component in the one or more solid compounds thus formed can be removed from the particulate solid to form hydrogen sulfide by contacting the particulate solid with a hydrocarbon at a temperature of 800°–1300° F. The sulfur component of the solid compound reacts with components of the hydrocarbon at this temperature to form gaseous hydrogen sulfide, and sometimes one or more gaseous or liquid organic sulfur compounds, which are simply released or easily removable from the particulate solid. Magnesia may be employed in place of alumina in many cases.

The present invention is particularly applicable to removing sulfur compounds from flue gas within an FCC unit regenerator by reaction of sulfur oxides in the flue gas with a reactive alumina component of a particulate solid introduced into the regenerator. Some available cracking catalysts contain a small amount of reactive alumina, but preferably the reactive alumina is part of a solid particulate employed in addition to the conventional particulate catalyst utilized in the FCC unit, since available catalysts do not usually include sufficient reactive alumina. The separate, alumina-containing particulate is added in an amount sufficient to remove the desired amount of sulfur compounds from the flue gas without adversely affecting the activity and selectivity of the cracking catalyst. The particulate, reactive alumina-containing material may be cycled between the FCC unit reactor and regenerator in the same manner as the FCC catalyst, without use of extraneous equipment and procedures. Sulfur compounds react to form a solid compound in the alumina-containing particulate, and are thereby removed from the FCC flue gas before the gas leaves the regenerator. The particulate, with the sulfur-containing compound therein, is then passed to the hydrocarbon cracking section of the FCC unit, along with regenerated catalyst, and is contacted therein with the hydrocarbon stream being processed. The solid sulfur-containing compound reacts with components of the hydrocarbons, forming hydrogen sulfide, which is carried out of the FCC reactor in the off-gas component of the processed hydrocarbon stream. Thus, the exit path of sulfur from the FCC unit is shifted from the FCC unit regenerator flue gas removal means to the FCC reactor hydrocarbon and off-gas removal means, so that substantially all the feed sulfur can be easily and economically handled by conventional hydrogen sulfide recovery means.

The present invention can also be applied to the removal of sulfur oxides from various gaseous mixtures such as stack gases and tail gases, as by contacting a solid particulate reactant containing reactive alumina with a stack gas at 1000°–1500° F, preferably in a desulfurization zone, to remove sulfur oxides from the stack gas by forming a solid compound in the reactant. The particulate reactant is thereafter regenerated to allow its further use in sulfur removal, preferably by reacting it with a hydrocarbon at 800°–1300° F in a solid reactant regeneration zone.

Figure 1:
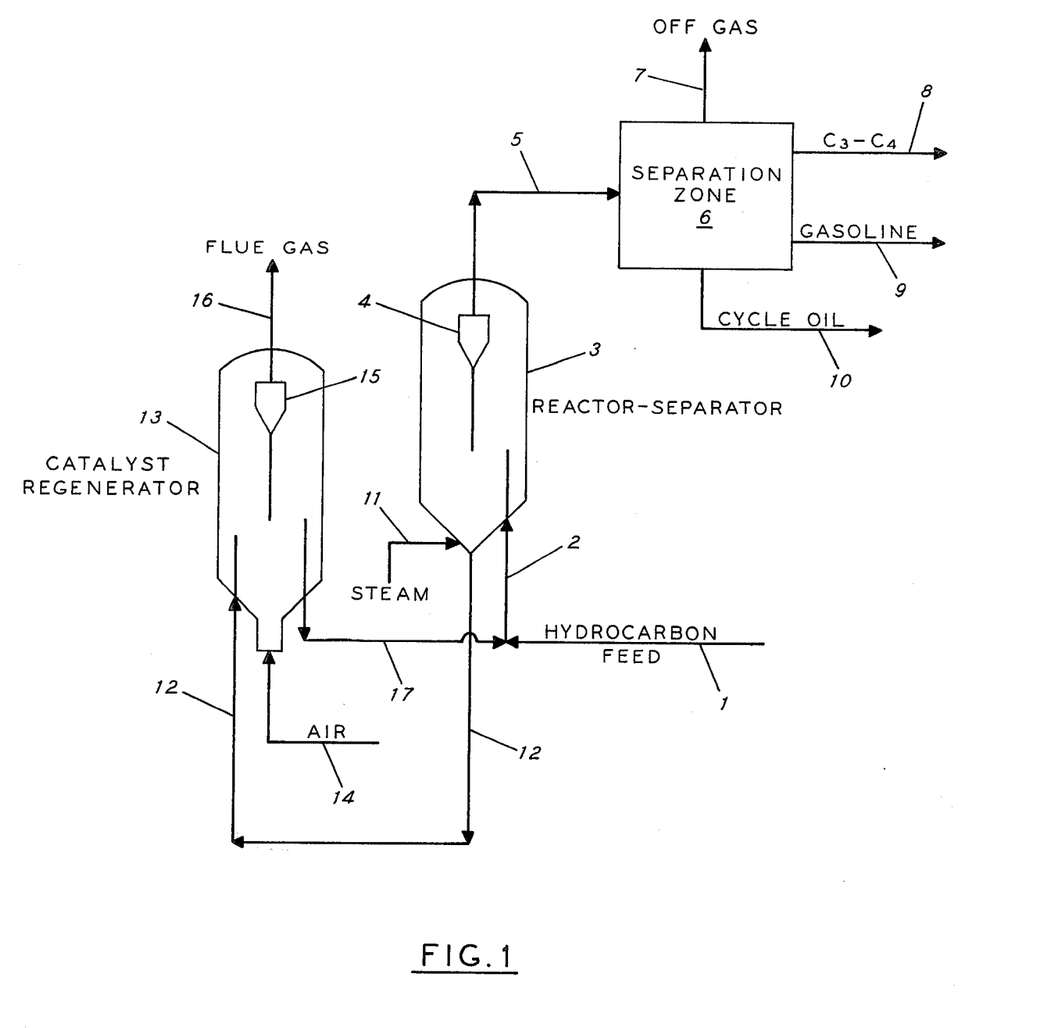
FIG. 1 is a schematic representation of an FCC unit depicted to facilitate illustration of the present invention in embodiments for removing sulfur oxides from flue gas in an FCC regenerator, and use of the sulfur component thereof in forming hydrogen sulfide.

Referring to FIG. 1, in general operation of the illustrated FCC system a sulfur-containing hydrocarbon feed, which may be preheated, is continuously passed into the FCC system by way of a conduit 1. The feed is combined with hot regenerated particulate catalyst in a riser conduit 2, and the stream of combined hydrocarbon feed and fluidized catalyst is passed upwardly through the riser 2, where most of the cracking and conversion of the hydrocarbon stream takes place, and thereafter into a reactor-separator vessel 3. In the reactor-separator 3, a further amount of conversion of the hydrocarbon stream may take place. During contact with the hydrocarbon stream in the cracking or conversion zone, i.e., the riser 2 and the reactor-separator 3, sulfur-containing coke is deposited on the catalyst particles and off-gas is formed. The fluid stream of processed hydrocarbons and off-gas is removed from the upper end of the reactor-separator 3, after having been separated from most of the entrained catalyst by means of a cyclone 4. The separated hydrocarbons and off-gas stream is withdrawn from the cyclone 4 and the reactor 3 through hydrocarbon and off-gas removal means such as a conduit 5, and is passed into a gas recovery unit including a separation zone 6. In the separation zone 6, an off-gas stream rich in hydrogen sulfide is separated from liquid processed hydrocarbons. The off-gas stream is withdrawn from the separation zone 6 through a conduit 7 and is passed to further conventional hydrogen sulfide recovery operations, such as an amine scrubber (not shown). A stream of $C_3$–$C_4$ hydrocarbons is withdrawn from the separation zone 6 through a conduit 8. A stream of gasoline-boiling-range hydrocarbons is withdrawn from the separation zone 6 through a conduit 9. A stream of cycle-oil-boiling-range hydrocarbons is withdrawn from the separation zone 6 through a conduit 10. Referring again to the reactor-separator 3, coked catalyst entering the vessel 3 from the riser 2 flows downwardly to the lower end of the vessel 3, either directly or after being separated from processed hydrocarbons and off-gas in the cyclone 4. The coked catalyst particles in the lower end of the vessel 3 are stripped of volatile hydrocarbons by the use of hot steam, which is introduced into the vessel 3 through the conduit 11. The coked catalyst, after being stripped, is then passed from the reactor-separator 3 through a transfer conduit 12 into a catalyst regenerator 13. An oxygen-containing gas comprising air is introduced into the regenerator 13 through a conduit 14. In the regenerator 13 a fluidized bed of catalyst particles is contacted with the oxygen-containing gas to burn sulfur-containing coke off the catalyst, forming a flue gas mixture containing gaseous carbon oxides, steam, sulfur oxides, etc., and lowering the coke content of the catalyst particles in the fluidized bed in the regenerator 13. The resulting sulfur-containing flue gas is removed from the upper end of the regenerator vessel 13, after having been separated from most of the entrained catalyst by means of a cyclone 15. The separated flue gas is withdrawn from the cyclone 15 and the regenerator 13 through flue gas removal means such as a conduit 16, and is passed, if desired, to an electrostatic precipitator and a conventional carbon monoxide boiler (not shown). After conventional processing to recover heat values and remove particulates and undesirable compounds, e.g., carbon monoxide, the flue gas is then discarded. Coke-depleted, regenerated catalyst is continuously removed from the regenerator vessel 13 through a transfer conduit 17 and is returned to the riser 2 and contacted with the hydrocarbon feed stream in continued catalytic use as described above.

According to an embodiment of the invention preferred for use in FCC systems employing a standard, incomplete combustion mode of catalyst regeneration, alumina-containing particles having the same fluidizable properties (e.g., size, shape and density) as the cracking catalyst, and containing reactive alumina are introduced into the FCC system, which is otherwise operated as described above, and the particles are contacted with the flue gas in the regenerator vessel 13 at the same time and in the same manner as the catalyst. The resulting composition of matter includes a mixture of 90-99.5 weight percent of cracking catalyst particles and 0.5-10 weight percent of the alumina-containing particulate solid. The alumina-containing particulate solid may include 0.1-10 weight percent magnesium, as magnesia, and/or 0.1-5 weight percent chromium, as chromia. The alumina-containing particles are preferably substantially free from silica; that is, they preferably contain less than 1 weight percent silica. The cracking catalyst particles preferably contain 5-15 weight percent of a crystalline aluminosilicate zeolite in an amorphous silica-alumina matrix. Alumina contained in the particulate solid reacts with sulfur oxides in the gas in the regenerator 11, forming a solid compound including sulfur and aluminum atoms, e.g., aluminum sulfate, as a component of the particulate solid, and thereby removing sulfur compounds from the flue gas. The sulfur-containing solid particles are thereafter removed from the regenerator vessel 13 along with regenerated catalyst and are passed through the conduit 17 into contact with the hydrocarbon feed in the riser 2. When contacted with the hydrocarbon stream in the riser 2, the solid sulfur-containing compound in the particulate solid reacts with components of the hydrocarbons to form hydrogen sulfide, and possibly other sulfur compounds. The particulate solid material is discharged into the reactor-separator 3 from the riser 2 along with coked catalyst and the hydrocarbon and off-gas stream. The particulate solid is separated from the hydrocarbon and off-gas stream in the same manner as the catalyst is separated from the hydrocarbons, as described above. The hydrogen sulfide formed by reaction between the solid sulfur-containing compound and components of the hydrocarbon feed is then carried out of the reactor as part of the hydrocarbon and off-gas stream removed from reactor-separator 3 through the conduit 5, thus changing the removal pathway from the system of the sulfur component of the regenerator flue gas. The incremental amount of hydrogen sulfide introduced into the processed hydrocarbon and off-gas stream removed from the reactor-separator 3 by the conduit 5 is relatively small. This extra hydrogen sulfide is no more than about 5-15% of the hydrogen sulfide already normally present in the processed hydrocarbon and off-gas stream in the case when the FCC system is operated in a conventional manner. Accordingly, the extra amount of hydrogen sulfide added to the off-gas stream removed through the conduit 7, can be easily recovered in a conventional manner by the same operation already used to recover hydrogen sulfide from the off-gas. In this way, sulfur entering the FCC system in the hydrocarbon feed through the conduit 1 is removed from the FCC system primarily by the means employed to remove off-gas from the reactor-separator 3, i.e., through the conduit 5. The amount of sulfur removed from the system by the means for removing flue gas from the regenerator 13, i.e., the conduit 16, is substantially reduced. The large added expense and operating inconvenience of subsequently removing sulfur compounds from the flue gas stream by a conventional flue gas desulfurization operation is thereby obviated. The solid alumina-containing particles, freed from solid sulfur compounds in the riser 2 and the reactor-separator 3, may be returned to the regenerator vessel 13 through the transfer conduit 12 in admixture with, and in the same manner as, catalyst particles. Accordingly, no added operating steps or extraneous equipment are needed to remove sulfur compounds from the flue gas in an FCC system when operating according to this embodiment of the invention. The FCC system can be operated primarily by normal procedures and the regenerator flue gas can be freed from sulfur compounds by simply adding the reactive alumina-containing particulate solid to the continuously circulating stream of FCC catalyst in the system.

Referring further to FIG. 1, according to an embodiment of the invention preferred for use in FCC systems employing a high temperature, complete combustion mode of catalyst regeneration, wherein regenerated catalyst removed from the regenerator contains substantially no coke carbon, i.e., less than 0.2%, a particulate solid other than the catalyst is not employed in the FCC system. Instead, a catalyst composition which contains at 10 ppm to 1 weight percent reactive alumina is selected for use in the FCC system. Sufficient air is introduced into the catalyst regenerator 13 through the conduit 14 to provide enough oxygen to react with substantially all the coke carbon contained in catalyst introduced into the regenerator 13 from the conduit 12 to form carbon dioxide. Sulfur-containing coke is deposited on the catalyst in the riser 2 by contact with a sulfur-containing hydrocarbon feed and is burned off catalyst in the regenerator 13 by reaction with oxygen to form a flue gas mixture containing sulfur dioxide and sulfur trioxide, as well as some residual oxygen. The flue gas is contacted, in the regenerator 13, with catalyst particles containing less than 0.2 weight percent coke carbon, and preferably less than 0.1 weight percent. Reactive alumina contained in the catalyst particles is reacted with the sulfur oxides in the flue gas to form at least one solid compound containing sulfur and aluminum atoms, such as aluminum sulfate, as a component of catalyst particles. Gaseous sulfur compounds are thereby removed from the flue gas, which is then withdrawn from the regenerator 13 through the conduit 16. Catalyst particles containing the solid sulfur compound are removed from the regenerator 13 through the conduit 17, passed into the riser 2, and contacted therein with hydrocarbon feed introduced through the conduit 1. The solid sulfur compound in the catalyst particles is reacted with one or more components of the hydrocarbon feed to form hydrogen sulfide and possibly other sulfur compounds. The hydrogen sulfide is released from the catalyst particles into the hydrocarbon and off-gas stream in the riser 2 and the reactor-separator 3. Sulfur is thus removed from the flue gas in the regenerator 13 and transferred, primarily in the form of hydrogen sulfide, into the stream of processed hydrocarbons and off-gas withdrawn from the reactor-separator 3 through the conduit 5. This hydrogen sulfide becomes a small incremental part of the off-gas separated from the liquid processed hydrocarbons in the separation zone 6 and withdrawn from the FCC system through the conduit 7.

Figure 2:
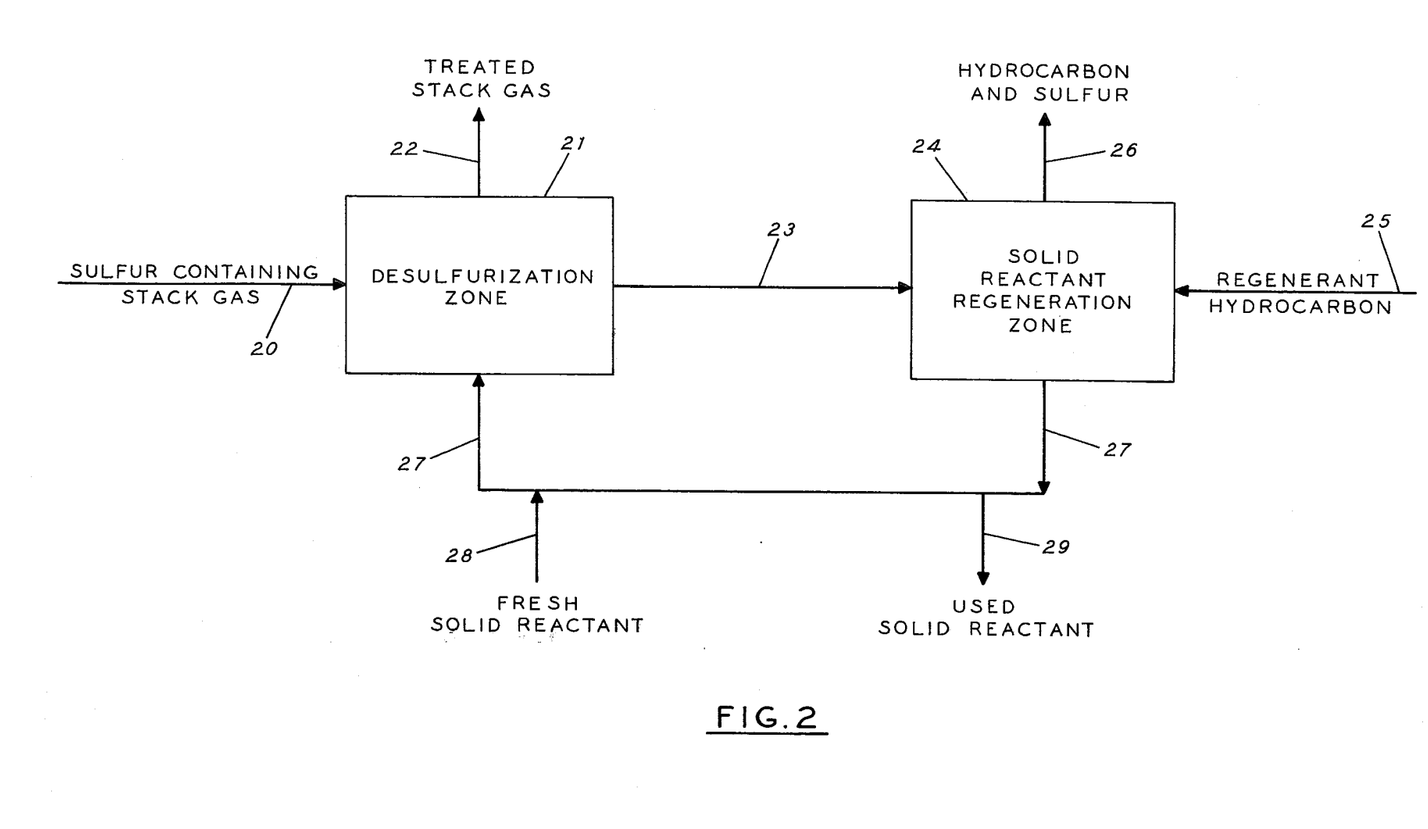
FIG. 2 is a schematic representation of the present invention in an embodiment employed for removing sulfur oxides from stack gas produced by combustion of sulfur-containing hydrocarbonaceous fuels, and formation of hydrogen sulfide using the sulfur component from the stack gas.

Referring to FIG. 2, a sulfur oxides-containing stack gas mixture is introduced through a conduit 20 into a desulfurization zone 21 and is contacted therein with a bed of solid reactant particles containing reactive alumina. Sulfur dioxide and sulfur trioxide in the stack gas react with reactive alumina in the solid reactant to remove sulfur compounds from the stack gas, forming a solid aluminum and sulfur-containing compound as a component of the reactant particles. Sulfur depleted, treated stack gas is then removed from the desulfurization zone 21 through a conduit 22 and withdrawn from the process. Sulfur-containing solid reactant particles are removed from the desulfurization zone 21 through a conduit 23 and are passed into a solid reactant regeneration zone 24. In the reactant regenerator 24, the sulfur-containing reactant particles are contacted with a regenerant hydrocarbon introduced to the regenerator 24 through a conduit 25. Components of the hydrocarbon react with the solid sulfur-containing compound component of the solid reactant particles to form hydrogen sulfide and possibly other sulfur compounds. The hydrocarbon and hydrogen sulfide are then separated from the regenerated solid reactant particles and are removed from the reactant regeneration zone through a conduit 26. The regenerated solid reactant is removed from the reactant regeneration zone through the conduit 27 and recycled to the desulfurization zone 21 for further desulfurization use as described above. Fresh solid reactant particles are introduced, as needed, into the conduit 27 from a conduit 28. Used reactant particles are removed from the conduit 27 via a conduit 29, when desired.

DETAILED DESCRIPTION OF THE INVENTION

The term "reactive alumina," as used herein, refers solely to the weight fraction of alumina contained in a solid particle which reacts to form a sulfate of aluminum when the solid particle is treated by the following steps:

1. passing a stream of a gas mixture containing, by weight, 10% water, 1% hydrogen sulfide, 10% hydrogen and 79% nitrogen over the solid particle continuously at a temperature of 1200° F and atmospheric pressure until the weight of the solid particle is substantially constant:

2. passing a stream of gas mixture containing by weight, 10% hydrogen, 15% carbon dioxide, 2% oxygen and 73% nitrogen over the solid particle resulting from step (1) at a temperature of 1200° F and atmospheric pressure until the weight of the solid particle is substantially constant, the weight of the particle at this time being designated "$W_a$;" and 3. passing a stream of a gas mixture containing, by weight, 0.05% sulfur dioxide, and, in addition, the same gases in the same proportions as used in step (2), over the solid particle resulting from step (2) at a temperature of 1200° F and atmospheric pressure until the weight of the solid particle is substantially constant, the weight of the solid particle at this time being designated "$W_s$."

The weight fraction of reactive alumina in the solid particle, designated "$X_a$," is determined by the formula $$X_a = \frac{(\text{molecular weight of Al}_2\text{O}_3)}{(3 \times \text{molecular weight of SO}_3)} \times \frac{(W_s - W_a)}{(W_a)}$$

The sulfur compound-containing gases from which sulfur compounds are removed by the present invention are flue gases or stack gases produced by combustion of sulfur-containing fuels, tail gas streams form gas desulfurization systems such as Claus desulfurization operations, flue gases produced during regeneration of catalysts in petroleum refinery hydrocarbon conversion systems, particularly in fluid catalytic cracking systems, and like sulfur-containing gaseous mixtures. Sulfur is normally present in such stack gases, tail gases and flue gases primarily in the form of sulfur dioxide and sulfur trioxide. In order for the gaseous sulfur compounds in such gases (other than sulfur trioxide) to be reacted with reactive alumina, the stack gas or flue gas stream, when being reacted with reactive alumina, should contain an amount of oxygen, i.e., molecular oxygen, sufficient to react stoichiometrically to form a sulfate with the sulfur component of the gaseous sulfur compounds in the flue gas stream which it is desired to remove from the flue gas. The amount of oxygen required, if any, depends upon the type and amount of gaseous sulfur compounds, such as sulfur dioxide, which it is desired to remove from the gas being treated.

The reactive alumina may be a part of a pure alumina particle or may be used as an alumina phase in a heterogeneous particle in a mixture with one or more other refractory materials, e.g., inorganic oxides. We have found that substantially pure alumina contains about 1–2 weight percent reactive alumina. Alumina which is chemically combined with silica, as in silica-alumina cogels and zeolites, including the molecular sieve components of conventional FCC catalysts (such as faujasites), normally contains substantially no reactive alumina. The reactive alumina is preferably employed in the form of a component in a particulate solid. The amount of reactive alumina included in the particulate solid is at least sufficient to react with the desired amount of sulfur compounds in the gas being treated to form one or more solid compounds containing aluminum atoms and sulfur atoms. If the contact time between a particulate solid and the gas being treated is shorter than is necessary to allow complete reaction of all the available reactive alumina in the particulate solid, then a proportional, additional amount of the particulate solid may be employed to remove the desired amount of sulfur compounds from the gas.

In some cases, it may be possible to substitute other suitable materials for the reactive alumina to form one or more solid sulfur-containing compounds, particularly reactive magnesia. When it is desired to use reactive magnesia in removing sulfur compounds from a gas, its concentration in a solid particle may be determined, and the particles used may be employed, in exactly the same manner as the reactive alumina described above. Mixtures of reactive magnesia with reactive alumina may also be used. Alumina is, however, preferred for use over magnesia.

We have found that reactive magnesia and particularly reactive alumina have properties which are essential for use in embodiments of the present invention. First, alumina and magnesia react with sulfur oxides to form fairly stable sulfates at temperatures in the range from 1000° F to 1500° F in a nonreducing atmosphere. Second, the sulfates of aluminum and magnesium can be reduced to their sulfides in a reducing atmosphere at temperatures in the range from 800° F to 1300° F. Third, the sulfides of aluminum and magnesium will react by hydrolysis to form hydrogen sulfide gas at temperatures in the range from 800° F to 1300° F.

On the other hand, materials which do not possess all of the above-described properties are either detrimental to operation of embodiments of the present invention or else have no effect on the operation. Materials which have a nonhydrolyzable sulfide and which also have an unstable sulfate, e.g. iron, are actually detrimental to operation of embodiments of the present invention. Materials such as iron would form a stable sulfur-containing compound at conditions at which it is desired to release hydrogen sulfide, and would release a sulfur-containing gas at conditions at which it is desired to form a stable sulfur-containing compound, such as a sulfate.

Materials which form a stable sulfate at the conditions desired for sulfate formation, but which have a stable sulfide at the conditions desired for hydrolysis of the sulfide to form hydrogen sulfide, have no effect on operation of embodiments of the present process. These materials include lithium, sodium, potassium, calcium, barium, copper, silver, cadmium, manganese, etc. Although such materials are not particularly detrimental to operation of the present invention, it is preferred that they are not present in a particulate solid used for removing sulfur compounds from gases according to the present invention, since they simply form a nonregenerable sulfur-containing solid.

Materials which do not form a stable sulfate at the conditions desired for sulfate formation but do have a sulfide which hydrolyzes to form hydrogen sulfide at the conditions desired for hydrolysis of the sulfide also have no direct effect on operation of embodiments of the present process. These include chromium, titanium, zirconium and uranium. Unlike the alkali metals, copper, etc., discussed above, which have a stable sulfide, it may be desirable to include materials such as chromium, titanium, etc., in a particulate solid used for removing sulfur compounds from gases according to the present invention, since these materials may promote coke burnoff from the particulate solid.

Other materials which may be substituted for reactive alumina and reactive magnesia, but not necessarily with equivalent results, are thorium oxide and tantalum oxide.

The sulfur-containing flue gas, tail gas, or stack gas mixture may be contacted with the reactive alumina-containing material in any suitable manner, as by contacting the gas and alumina in cocurrent or countercurrent flow, by passing the gas through a fixed bed of a particulate solid containing the alumina, or by passing the gas through a fluidized bed of an alumina-containing particulate solid. A combination of two or more of these contacting schemes may also be used. Preferably, an alumina-containing particulate solid is maintained as a fluidized bed, and the gas being treated is passed upwardly through the bed to at least partially fluidize the particulate solid.

The alumina and the gas to be treated are contacted at a temperature of 1000° F to 1500° F, and preferably, about 1100° F to about 1500° F. Sulfur trioxide, or sulfur dioxide and oxygen, and reactive alumina are reacted within this temperature range to form one or more solid compounds containing sulfur atoms and aluminum atoms. The sulfur component of the sulfur oxides is believed to be converted to the sulfate form, so that the solid compounds formed include sulfates of aluminum such as aluminum oxysulfate and aluminum sulfate. The composition of the one or more solid sulfur and aluminum-containing compounds formed in the reaction with alumina is not important, however. We have found that the solid sulfur-containing compounds thus formed are stable at 1000° F to 1500° F in the flue gas. This property, rather than the composition of the compounds formed, is essential to removal of sulfur from the gas. By reacting gaseous compounds of sulfur in the flue gas to form the one or more solid compounds, such as a sulfate of aluminum, the sulfur is effectively removed from the flue gas. The gas, having been thus freed from at least a part of its sulfur oxides content, can then be easily mechanically separated from the sulfur compound-containing particulate solid. When magnesia is substituted for alumina, the solid sulfur atom and magnesium atom-containing compounds formed include magnesium sulfate.

The solid sulfur-containing compounds, preferably in the form of a component of a particulate solid, after being separated from the sulfur-depleted stack gas, tail gas or flue gas, are then regenerated to form alumina and release hydrogen sulfide by contacting the particulate solid with a hydrocarbon at a temperature of 800° F to 1300° F, preferably 850° F to 1100° F, and reacting the solid sulfur-containing compound with one or more components of the hydrocarbon. The particulate solid can be contacted with the hydrocarbon in any suitable manner, e.g., by passing the hydrocarbon and the particulate solid in cocurrent or countercurrent flow, or by passing a stream of the hydrocarbon upwardly or downwardly through a fixed bed of the particulate solid, or by passing a fluid stream of the hydrocarbon upwardly through a fluidized bed of the particulate solid. A combination of two or more contacting schemes may also be used. Preferably, a stream of the hydrocarbon is passed in upflow fashion through a dilute-phase and/or dense-phase fluidized bed of a particulate solid containing the solid sulfur compound. The resulting hydrogen sulfide, and any other fluid sulfur compounds formed by contacting the hydrocarbon with the sulfur-containing solid, are released from the particulate solid and are carried away from the particulate solid in the hydrocarbon stream.

The hydrocarbon stream used in such a system need not be made up solely of hydrocarbons, but may also contain such other relatively inert fluid materials as steam, nitrogen, etc. The hydrocarbons which are contacted with the sulfur-containing particulate solid generally have at least 6 carbon atoms per molecule, although some lighter hydrocarbons such as $C_3$14 $C_5$ naphthenes may be suitable in some cases. Preferred hydrocarbons are those with normal boiling points above about 400° F. Mixtures of hydrocarbons, such as are found in petroleum refinery streams, or in hydrocarbon streams derived from coal liquefaction operations, are preferred for use in the present process, because such streams are readily available and are relatively inexpensive. Such streams normally contain, for example, paraffins, naphthenes, olefins, monocyclic aromatics, polycyclic aromatics, etc., any of which, and any mixtures of which, are suitable for use in the present process. Such hydrocarbons are present in petroleum refinery streams in widely varying relative concentrations, all of which are suitable. Examples of suitable petroleum refinery fractions and streams are light gas oils, heavy gas oils, vacuum gas oils, etc. Also suitable for use are heavy residual hydrocarbons, such as vacuum residua. Mixtures of two or more such streams or fractions are also suitable for use. The hydrocarbon employed may be used in the form of a vapor-phase stream, a liquid-phase stream, or a mixed vapor-liquid stream. Solid hydrocarbon particles entrained in fluid hydrocarbons or in a fluid which is inert in the system may also be utilized in some cases, e.g., a heavy hydrocarbonaceous particulate solid which is fluidized and entrained in a gas such as steam, nitrogen, or a lighter hydrocarbon.

It may be possible to employ a hydrogen-containing gas, a carbon monoxide-containing gas, or both, in place of the hydrocarbon or in admixture with the hydrocarbon to form hydrogen sulfide in some cases, but not necessarily with equivalent results. The use of a hydrocarbon is particularly preferred.

The solid sulfur-containing compound, preferably as a component of a particulate solid, and one or more components of the hydrocarbon stream are reacted to form hydrogen sulfide. Some other fluid organic sulfur compounds such as thiophenes, thioethers, etc., may also be formed in some cases. The resulting hydrogen sulfide (and any other fluid sulfur compounds formed) may then be simply mechanically separated from the resulting sulfur-depleted particulate solid. The hydrogen sulfide formed by reaction between the hydrocarbon and solid sulfur-containing compound is preferably continously separated from the particulate solid as a component of the hydrocarbon stream, which is preferably passed continuously in contact with the particulate solid and then separated therefrom.

In one preferred embodiment of the present invention, the process is employed for removing sulfur compounds from flue gas in a fluid catalyst cracking process which includes the following operational steps:

a. cracking a sulfur-containing hydrocarbon stream in contact with a bed of a particulate cracking catalyst in a cracking zone at cracking conditions including a temperature in the range from 800° F to 1300° F, whereby sulfur-containing coke is deposited on the particulate catalyst, and removing the hydrocarbon stream from the cracking zone;

b. passing coke-containing catalyst from the cracking zone into a cracking catalyst regeneration zone, passing an oxygen-containing gas into the catalyst regeneration zone, and burning off sulfur-containing coke from the catalyst in the regeneration zone at a temperature in the range from 1000° F to 1500° F to form a flue gas containing sulfur oxides, and removing the flue gas from the catalyst regeneration zone; and c. returning the resulting coke-depleted catalyst from the catalyst regeneration zone to contact with the hydrocarbon stream in the cracking zone.

The same sulfur-containing hydrocarbon feeds normally processed in commercial FCC systems may be processed in a cracking system employing the present invention. Suitable feedstocks include, for example, gas oils, light cycle oils, heavy cycle oils, etc., which usually contain about 0.1 weight percent to about 10 weight percent sulfur. Sulfur may be present in the hydrocarbon feed as a thiophene, disulfide, thioether, etc. Suitable feedstocks normally boil in the range from 400° F to 1100° F or higher. A suitable feed may include recycled hydrocarbons which have already been cracked.

The cracking catalyst employed is a conventional particulate cracking catalyst containing silica and alumina. It may be a conventional amorphous cracking catalyst containing an amorphous mixture of silica and alumina, or, more preferably, a conventional zeolite-containing cracking catalyst including an amorphous silica-alumina matrix and a crystalline aluminosilicate zeolite. The amorphous matrix generally constitutes 85–95 weight percent of the cracking catalyst, with the remaining 5–15 weight percent being zeolite component dispersed, or imbedded, in the matrix. The zeolite may be rare earth-exchanged or hydrogen-exchanged. Conventional zeolite-containing cracking catalysts often include an X-type zeolite or a Y-type zeolite.

The catalyst regeneration zone used in an FCC system employing an embodiment of the present invention may be of conventional design. The gaseous atmosphere inside the regeneration zone in an FCC system is normally comprised of a mixture of gases in concentrations which vary according to the locus within the regenerator. The concentrations of gases also vary according to the coke concentration on catalyst particles entering the regenerator, and according to the amount of molecular oxygen and steam passed into the regenerator. Generally, the gaseous atmosphere in the regenerator contains 5 to 25% steam, varying amounts of oxygen, carbon monoxide, nitrogen, carbon dioxide, sulfur dioxide, sulfur trioxide, sometimes a small amount of hydrogen sulfide, and traces of hydrogen, hydrocarbons, etc. In order to facilitate removal of sulfur compounds from the flue gas within an FCC regenerator according to the present invention, substantially coke-free particles of a reactive alumina-containing material, i.e., particles containing less than 0.2 weight percent average coke, preferably less than 0.1 weight percent, must contact the gaseous regenerator atmosphere at a locus within the regenerator at which the gaseous atmosphere contains sulfur trioxide, or molecular oxygen and sulfur dioxide. Other gases are, of course, also present in the gaseous atmosphere at the point of contact. In FCC catalyst regenerators of conventional design, the FCC flue gas therein contains oxygen and sulfur dioxide, or sulfur trioxide, and contacts at least some of the substantially regenerated catalyst particles. When FCC regenerators of this type are employed, contact between substantially coke-free reactive alumina-containing particles and oxygen and sulfur dioxide, or sulfur trioxide-containing flue gas is facilitated.

Cracking conditions employed in the cracking or conversion step in the FCC system are frequently provided in part by preheating or heat exchanging the hydrocarbon feed to bring it to temperature of about 600°–750° F before introducing it into the cracking zone; however, preheating is not essential. A catalyst-/hydrocarbon weight ratio of about 3 to about 10 is preferably used. A hydrocarbon weight space velocity in the cracking zone of about 5 to about 50 per hour is preferably used. The average amount of coke contained in the catalyst after contact with the hydrocarbon, at the time the catalyst is passed to the catalyst regenerator is preferably between about 0.5 weight percent and about 2.5 weight percent, depending on the carbon content of regenerated catalyst in a particular FCC system, and the heat balance therein.

The catalyst regeneration zone employed may use any oxygen-containing gas which is easily obtainable, such as air, which is the normal source of oxygen used in commercial FCC systems.

In an embodiment of the invention for use in an FCC system wherein an alumina-containing particulate solid other than the particulate cracking catalyst is employed to remove sulfur from the regenerator flue gas, the separate alumina-containing particulate solid is preferably formed of conventional alumina particles. Suitable particulate alumina is commercially available from various sources or can be fabricated by various well-known methods. The particles of the alumina-containing particulate solid are preferably of about the size, shape and density of the cracking catalyst particles. A particularly preferred composition for use in a separate alumina-containing particulate solid in FCC systems in alumina particles containing chromia, magnesia, or both. Particularly good results have been obtained when using particulate alumina containing about 5 percent magnesium, as magnesia, and 2 weight percent chromium, as chromia. The magnesium and chromium components preferred for use in the separate alumina-containing particulate solid are thought to aid in burnoff of coke from the particulate solid when it is passed into the FCC regeneration zone, along with the coked catalyst particles, in cases where coke has previously been deposited on the alumina particles in the FCC cracking zone. The magnesium and chromium components may be added to the alumina particles by conventional aqueous impregnation or any other conventional technique. The alumina-containing particulate solid must be substantially free from carbon when reacted with the sulfur oxides. That is, the separate solid particles of alumina are freed from sufficient carbon in the regeneration zone, if they contain coke when introduced therein, so that at least a portion of the resulting separate alumina-containing particles have a carbon content of less than 0.2 weight percent, preferably less than 0.1 weight percent or even more preferably 0.05 weight percent, when contacted with the gaseous sulfur compounds present in the flue gas.

The alumina-containing particulate solid is mixed with the cracking catalyst according to the invention to form a composition of matter comprising (a) 90–99.5 weight percent cracking catalyst particles, and (b) 0.5–10 weight percent alumina-containing particles having 0.1–2 weight percent active alumina therein. Preferably the composition formed by mixing the alumina particles and the cracking catalyst particles includes about 93–99 weight percent cracking catalyst particles and about 1–7 weight percent alumina-containing particles, with the alumina-containing particles having about 0.5–2 weight percent reactive alumina therein.

Also according to the invention, a magnesia-containing particulate solid may be mixed with the cracking catalyst to form a composition of matter comprising (a) 90–99.5 weight percent cracking catalyst particles, and (b) 0.5–10 weight percent magnesia-containing particles having 0.1–2 weight percent reactive magnesia therein.

The alumina-containing particles preferably employed in the composition are preferably substantially free from silica, i.e., they preferably contain less than 1 weight percent silica.

The following illustrative embodiment is a preferred embodiment of the use of the present invention in a fluid catalyst cracking system wherein a separate particulate solid is added to the cracking catalyst in order to remove gaseous sulfur compounds from an FCC regenerator flue gas.

ILLUSTRATIVE EMBODIMENT I

In a preferred embodiment of the present invention as employed in removing sulfur compounds from regenerator flue gas in a fluid catalyst cracking system using a separate particulate solid other than the cracking catalyst, the FCC system shown in FIG. 1 and described above is employed. The hydrocarbon feed processed in the system is a gas-oil stock with an initial boiling point of about 650° F and an end boiling point of about 1050° F. The hydrocarbon feed contains a relatively high sulfur concentration of about 2.5 weight percent. The hydrocarbon feed is introduced into the conduit 1 at the rate of 603,000 pounds per hour at a temperature of 680° F, and is passed into the riser 2. Regenerated, conventional zeolite-containing FCC cracking catalyst is passed into the riser 2 from the conduit 17 at the rate of 2,520,000 pounds per hour at a temperature of 1185° F. The temperature of the resulting equilibrium catalyst-oil mixture is about 900° F. The average carbon content of regenerated catalyst entering the riser 2 is about 0.35 weight percent. The average residence time of the hydrocarbon feed in the riser 2 is 5 seconds. Coked catalyst particles entering the reactor-separator 3 pass generally downwardly through the reactor-separator 3 and are partially stripped of volatiles by steam, which is introduced into the reactor-separator 3 through the conduit 11 at the rate of 8500 pounds per hour. Coke-containing catalyst is passed through the transfer conduit 12 into the regenerator 13 at the rate of 2,550,000 pounds per hour. Catalyst entering the regenerator 13 from the conduit 12 has an average coke content of 1.7 weight percent and the coke has a sulfur content of 3 weight percent. Oxygen is introduced to the regenerator 13 from the conduit 14 at the rate of 101,000 pounds per hour in air at a temperature of 275° F. Combustion of the coke contained in the catalyst with oxygen heats the catalyst particles to a temperature of 1185° F and produces a sulfur compound-containing flue gas. Sulfur is present in the flue gas primarily as sulfur dioxide and sulfur trioxide. The flue gas also contains about 15% steam and some unconsumed oxygen. The flue gas is about the same temperature as the catalyst, i.e., 1185° F. In conventional operation of the FCC system described, without the benefit of the present invention, a flue gas containing 2200 parts per million of sulfur oxides, or 1030 pounds per hour of sulfur, would have been removed from the regenerator 13 via the conduit 16. According to the present invention, however, 0.05 pounds of alumina particles other than, and in addition to, the cracking catalyst particles, and containing 5 weight percent magnesium, as magnesia, and 2 weight percent chromium, as chromia, are admixed with the circulating cracking catalyst particles, per pound of the catalyst. The alumina particles are substantially the same size, shape and density as the particulate FCC catalyst. The alumina particles contain an average of 1.7 weight percent reactive alumina. Further according to the invention, the reactive alumina reacts with sulfur trioxide, and with sulfur dioxide and oxygen, from the gaseous atmosphere in the regenerator 13. The sulfur oxides, oxygen and alumina react to form at least one solid sulfur-containing compound, such as aluminum sulfate, in the form of a component of the particulate alumina. The average residence time of the FCC cracking catalyst and the alumina particles in the regenerator 13 is 6 minutes. Alumina particles with a sulfur-containing component are removed from the regenerator 13 at the rate of 126,000 pounds per hour in admixture with regenerated catalyst. The mixture of sulfur-containing alumina particles and catalyst particles is passed through the conduit 17 into the riser 2. The alumina particles passed into the conduit 17 contain about 1.6 weight percent sulfur. Thus, about 1950 pounds per hour of sulfur are removed from the flue gas atmosphere with component of the regenerator 13 and become a part of the solid sulfur-containing compound in the alumina particles. The alumina particles are then passed to the riser 2 in admixture with the FCC cracking catalyst. Alumina particles which are passed into the riser 2 are contacted therein with the hydrocarbon feed, and reaction between the one or more solid sulfur-containing compounds and components of the hydrocarbon feed forms hydrogen sulfide, which, being gaseous, is released from the alumina particles into the hydrocarbon stream leaving the reaction zone of the FCC system. The incremental amount of hydrogen sulfide which is thereby released from the alumina particles into the hydrocarbon stream and withdrawn from the reactor-separator 3 through the conduit 5 is about 13 weight percent of the amount of off-gas hydrogen sulfide withdrawn through the conduit 5 in conventional operation.

In another embodiment of the invention, wherein a particulate FCC cracking catalyst is, itself, employed to remove sulfur-containing compounds from the FCC regenerator flue gas, the catalyst itself must be selected to contain 10 ppm to 10,000 ppm reactive alumina. We have found that some alumina-containing commercially available cracking catalysts do not contain any substantial amount, i.e., greater than 10 ppm, of reactive alumina. Such catalysts are not suitable for use in the present process, at least not without modification to include the necessary amount of reactive alumina. In some cases reactive alumina may be included in a particular FCC cracking catalyst, or the amount may be increased, by impregnating the catalyst with an aluminum compound, such as an aqueous solution of aluminum sulfate. On the other hand, we have found that some commercial cracking catalysts do include sufficient reactive alumina to be at least somewhat suitable for use in the practice of the present invention, if particular conditions, which are described hereinafter, are maintained in the FCC regenerator.

In an embodiment of the invention wherein reactive alumina in the cracking catalyst itself is used to remove sulfur compounds from the regenerator flue gas, the present method preferably involves the steps of:

1. including 10 ppm, by weight, to 10,000 ppm, by weight, reactive alumina in the particulate cracking catalyst;
2. passing sufficient oxygen into the regeneration zone employed in the FCC system in the oxygen-containing gas to react with substantially all the carbon in the coke on the catalyst particles in the regeneration zone to form oxides;
3. burning off sufficient coke from the catalyst particles in the regeneration zone to provide an average carbon content of less than 0.2 weight percent, preferably less than 0.1 weight percent, in the coke-depleted catalyst particles removed from the regeneration zone and recycled to the FCC cracking zone;
4. reacting the reactive alumina contained in the coke-depleted catalyst particles with sulfur oxides contained in the flue gas within the regeneration zone to form at least one solid compound including sulfur atoms and aluminum atoms as a component of the coke-depleted catalyst; and
5. forming hydrogen sulfide by contacting the solid compound with the hydrocarbon stream in the cracking zone, and removing the resulting hydrogen sulfide from the cracking zone along with the hydrocarbon stream.

The same cracking or conversion conditions employed in the previously described embodiment of the invention may also be employed in the case where the catalyst itself is used to remove gaseous sulfur compounds from the flue gas. The same cracking reactors, catalyst regenerators and flow schemes may generally be employed as are used in connection with the previously described embodiment. The residence time of the cracking catalyst in the regeneration zone in this embodiment is a period sufficient to provide substantially complete combustion of coke carbon to carbon oxides. Usually this is between about 3 minutes and about 10 minutes, depending on the pressure. It is essential that particles of the catalyst from which substantially all the coke has been removed in the regenerator are contacted with the sulfur oxide-containing flue gas after having the coke removed therefrom. Thus, regeneration schemes in which the coke-depleted, regenerated catalyst does not contact the sulfur-containing flue gas are not suitable for use in embodiments of the present invention unless properly modified to allow such contact. The coke content of the catalyst may be reduced to less than 0.2 weight percent and preferably less than 0.1 weight percent by any procedure conventionally used to remove coke from the catalyst, such as by regeneration with a high oxygen content gas at a relatively high regeneration temperature, or by use of coke burn-off additives in the catalyst composition, or by use of a multizone regenerator.

In cases where the catalyst regenerator design does not normally effect a substantial amount of contact between fully regenerated catalyst particles and flue gas at a point where the amount of sulfur oxides in the flue gas is relatively high, it is desirable to modify the regenerator design sufficiently to contact at least some fully regenerated catalyst particles with at least some of the high sulfur flue gas. Thus, in a multizone regeneration design, some fully regenerated catalyst from a later stage of regeneration may be passed back into contact with a flue gas having a high sulfur oxide content, e.g. in an earlier stage of regeneration, as by mixing some of the fully regenerated catalyst with less fully regenerated catalyst in the earlier stage of regeneration.

Reactive alumina contained in the coke-depleted catalyst particles reacts with the sulfur oxides contained in the flue gas within the regeneration zone to form at least one solid compound including sulfur atoms and aluminum atoms, such as aluminum sulfate. The catalyst particles are then removed from the regeneration zone, freeing the flue gas from a substantial portion of the sulfur compounds therein. The flue gas withdrawn from the regeneration zone thus has a diminished sulfur content. The sulfur-containing catalyst particles are then passed to the cracking zone and are contacted therein with the hydrocarbon feed stream in the conventional manner. By contacting the catalyst particles having a solid sulfur compound component with the feed at cracking conditions, the reaction between the sulfur compound and components of the feed forms hydrogen sulfide. This incremental hydrogen sulfide is removed from the cracking zone along with the large amount of hydrogen sulfide normally formed in the off-gas cracking zone. Thus, no particular departures need be made from the conventional operating steps useds in the cracking or conversion section of an FCC system when using an embodiment of the invention.

The following Illustrative Embodiment is a preferred embodiment of the use of the present invention in a fluid catalyst cracking system wherein reactive alumina contained in the cracking catalyst itself is employed to remove sulfur oxides from the FCC regenerator flue gas to form a sulfur-containing component in the catalyst to allow reaction of the sulfur-containing component to form hydrogen sulfide which is released into the off-gas removed from the FCC reactor.

ILLUSTRATIVE EMBODIMENT II

The FCC system shown in FIG. 1 and described above is employed. The hydrocarbon feed employed is a gas-oil stock with an initial boiling point of about 650° F and an end boiling point of about 1050° F. The hydrocarbon feed contains a relatively high sulfur concentration of 2.5 weight percent. The hydrocarbon feed is introduced into the conduit 1 at the rate of 766,000 pounds per hour at a temperature of 650° F and is passed into the riser 2. Regenerated, zeolite-containing FCC cracking catalyst is passed into the riser 2 from the conduit 17 at the rate of 3,216,000 pounds per hour at a temperature of 1260° F. The zeolite-containing cracking catalyst utilized in the process has been analyzed according to the procedure described above to determine its reactive alumina content, which is 300 ppm. The catalyst and hydrocarbon are admixed in the riser 2, and the temperature of the resulting equilibrium catalyst-oil mixture is about 930° F. The average carbon content of regenerated catalyst particles entering the riser 2 from the conduit 17 is about 0.05 weight percent. The average residence time of the hydrocarbon stream in the riser 2 is 5 seconds. Catalyst particles entering the reactor-separator 3 from the riser 2 flow generally downwardly and are partially stripped of volatiles by steam, introduced into the reactor-separator 3 through the conduit 11 at the rate of 900 pounds per hour. Catalyst particles with sulfur-containing coke deposited thereon are passed through the transfer conduit 12 into the regenerated 13 at the rate of 3,241,000 pounds per hour. Catalyst entering the regenerator 13 from the conduit 12 has an average coke content of 0.84 weight percent, and the coke on the catalyst has an average sulfur content of 3.0 weight percent. Oxygen is introduced into the regenerator 13 at the rate of 87,200 pounds per hour in air at a temperature of 260° F. Combustion of the coke on the catalyst with oxygen heats the catalyst to a temperature of about 1260° F and produces a flue gas containing sulfur dioxide and sulfur trioxide. The flue gas also contains steam and about 2 weight percent oxygen. In conventional operation of this FCC system, without benefit of the present invention, a flue gas containing 1890 ppm sulfur oxides, or 816 pounds per hour of sulfur, would have been removed from the regenerator 13 via the conduit 16. According to the present invention, however, a cracking catalyst has been analyzed and selected for use which contains 300 ppm, by weight, reactive alumina. The sulfur oxides from the regenerator flue gas and the reactive alumina contained in the catalyst particles react to form a solid compound, as a component of the catalyst, which contains sulfur and aluminum atoms, e.g., a sulfate of alumina. The average residence time of the FCC catalyst particles in the regenerator 13 is 6 minutes. The catalyst particles having a sulfur-containing compound component are removed from the regenerator 13 through the conduit 17 at the rate of 3,216,000 pounds per hour. About 773 pounds per hour of sulfur are removed from the flue gas in the regenerator 13 as a component of the catalyst particles. The flue gas removed from the regenerator 13 into the conduit 16 has a sulfur oxides concentration of only about 100 ppm. Thus, about 773 pounds per hour of sulfur are transferred from the regenerator flue gas removal stream into the reactor off-gas removal stream in the FCC system. The sulfur and aluminum-containing compound component of the catalyst particles is contacted with the hydrocarbon feed in the riser 2. Reaction between components of the hydrocarbon feed and the sulfur-containing compound results in the formation of an incremental amount of hydrogen sulfide in addition to the much larger amount of hydrogen sulfide conventionally formed by the cracking reactions in the riser 2. The incremental amount of hydrogen sulfide thus released from the catalyst particles into the processed hydrocarbon stream and thereafter withdrawn from the reactor-separator 3 through the conduit 5 is only about 8 weight percent of the amount of hydrogen sulfide already generated in the riser 2 in conventional operation. When not practicing the present invention, about 10,200 pounds per hour of hydrogen sulfide would normally be withdrawn from the reactor-separator 3 through the conduit 5. On the other hand, the relative amount of sulfur compounds removed from the flue gas within the regenerator 13 constitutes a very substantial fraction of the sulfur compounds in the flue gas. The concentration of sulfur-containing compounds in the flue gas finally removed from the regenerator 13 through the conduit 16, when operating according to the present invention, is only 100 ppm sulfur oxides, or 43 pounds of sulfur withdrawn per hour.

Waste gases from other refinery operations which contain sulfur oxides, dilute hydrogen sulfide, etc., may be passed into an FCC catalyst regenerator for disposal in some cases. The sulfur component of such gases can thereby be reacted to form a solid sulfur-containing compound component of a reactive alumina-containing particulate solid in the regenerator. The sulfur component of the particulate solid is then reacted with components of the hydrocarbon stream in the cracking section of the FCC unit to form a further incremental amount of hydrogen sulfide, which becomes an additional part of the hydrogen sulfide-rich reactor off-gas. The incremental hydrogen sulfide is then simply recovered along with the rest of the off-gas hydrogen sulfide, e.g. in an amine scrubbing operation.

The present invention may also be employed in moving bed hydrocarbon cracking systems by slight modification of the above-described procedures or in a fluid coking operation by using reactive alumina-containing particles as a heat transfer medium. Thus, hot alumina-containing particulate solids in such a coking operation are contacted with a sulfur-containing petroleum residuum in a coking zone at 800°–1300° F. Volatile hydrocarbon products and hydrogen sulfide produced are withdrawn from the coking zone and the hydrogen sulfide is separated from the product and recovered, e.g. by amine scrubbing. The resulting sulfur-containing coked particles are passed from the coking zone to a particulate heating and regeneration zone where the coke is burned off the particles to heat them sufficiently to provide the heat needed in the coking zone. Sulfur oxides in the resulting gas and reactive alumina in the particulate solids are reacted to form a solid sulfur and aluminum-containing compound, e.g. a sulfate, as a component of the particulate solids. The resulting hot, sulfur-depleted gas is then withdrawn from the heating and regeneration zone and may be used for steam generation. The heated coke-free particles are returned to the coking zone to supply heat therein and further contacted with the residuum. The sulfur-containing compound component of the particles is reacted with components of the residuum in the coking zone to form incremental hydrogen sulfide, which is withdrawn from the coking zone in the volatile products stream, separated from the products along with the rest of the hydrogen sulfide, and recovered, e.g. by the amine scrubbing operation. Thus, the gas from the regeneration zone is freed from sulfur, and may be discharged to the atmosphere after appropriate steam generation use, if desired.

In a further embodiment of the present invention, gaseous sulfur compounds are removed from sulfur-containing gaseous mixtures including tail gas, such as a tail gas stream recovered from a Claus desulfurization operation, or a stack gas such as that produced during combustion of sulfur containing fossil fuels such as coal, petroleum fractions, etc., or other hydrocarbonaceous fuels. In a gas desulfurization embodiment, the present invention involves the steps of:

1. removing sulfur oxides from a stream of a gaseous mixture of a sulfur oxide and at least one other gas selected from nitrogen, steam, carbon dioxide and molecular oxygen, by reacting the sulfur oxide in the mixture with alumina contained in a particulate solid reactant, the sulfur removal step preferably being performed in a desulfurization zone, at a temperature of 1000° F to 1500° F, to form at least one solid compound containing sulfur atoms and aluminum atoms in the solid reactant, and removing the resulting sulfur-depleted gas stream from the desulfurization zone; and 2. forming hydrogen sulfide from the solid compound in the solid reactant and a hydrocarbon by contacting the solid reactant with the hydrocarbon, preferably in a solid reactant regeneration zone, at a temperature in the range from 800° F to 1300° F, to form hydrogen sulfide, and removing the hydrogen sulfide from contact with the solid reactant.

In an embodiment of the invention for removing sulfur compounds from a stack gas or tail gas, means are provided for contacting a stream of the sulfur oxide-containing stack gas with a fixed bed, moving bed or fluidized bed of reactive alumina containing solid reactant particles. Preferably, the stack gas and the solid reactant particles are contacted in a desulfurization zone in which the stack gas is passed upwardly through a fluidized, dilute-phase or dense-phase bed of the solid reactant particles. In a stack gas desulfurization embodiment of the present invention, the particulate solid reactant is preferably made up of particles of alumina which are shaped and sized to provide a desired surface area and particle fluidizing properties to facilitate use of the particles in a fluidized bed in the desulfurization operation. The solid reactant particles may include other inorganic oxides, such as chromia, magnesia, titania, silica, etc., but such other inorganic oxides are preferably not present in the solid reactant particles in chemical combination with the alumina, or at least, not in chemical combination with more than a portion of the alumina.

The stack gas or tail gas to be desulfurized is preferably contacted with the solid reactant particles for a time period sufficient to react substantially all the reactive alumina in the reactant particles, usually about 3 minutes to about 60 minutes, a temperature in the range from 1000° F to 1500° F, in order to react sulfur trioxide, or sulfur dioxide and oxygen, with the reactive alumina in the reacted particles to form a stable, solid compound in the reactant which contains sulfur atoms and aluminum atoms, e.g., aluminum sulfate. The treated sulfur-depleted stack gas is then separated from the solid reactant. This gas-solid separation operation may be performed using one or more cyclone separators or other known separation means. The stack gas can then be released directly to the atmosphere, or may be further processed to recover heating value from it, or treated for removal of particulates, if desired.

Typical stack gases, such as those which result from steam generation in fired boilers using coal as a fuel, exit the combustion chamber at a temperature of about 1800°-2200° F. The temperature of the gas is typically reduced to about a temperature of about 500°-800° F (usually referred to as the cold end temperature) by heat exchange with a series of steam generation coils. The 500°-800° F gas may then be used to preheat air to be employed in the combustion chamber. Previously, when desulfurization of the stack gas was desired, the gas has usually been desulfurized at a temperature of 120°-800° F, and then released into the atmosphere. The stack gas desulfurization process of the present invention is employed to remove sulfur oxide from a stack gas preferably at a temperature of about 1100°-1500° F, after the gas has been partially reduced in temperature from the original 1800°-2200° F in initial steam generation coils, but before the gas is passed to the steam generation coils which further reduce the temperature of the gas to the cold end temperature of 500°-800° F. Alternatively, in some cases it may be desirable to utilize the heat content of the gas for some other purpose prior to utilizing the desulfurization process of this invention. In such cases, the stack gas is reheated to the necessary desulfurization temperature, i.e., 1000°-1500° F, and preferably 1100° F to 1500° F. In coal burning for steam generation, or in other combustion operations which utilize fluidized combustion of a fuel such as particulate coal, it may be desirable to accomplish the combustion at a lower temperature than the typical 1800°-2200° F temperature found in furnaces in non-fluidized combustion chambers. In fluidized bed combustion systems, temperatures in the combustion zone of about 1500°-1650° F are typical. In such fluidized bed combustion systems, it may be desirable to add the solid reactant particles directly to the oxygen and fuel in the combustion chamber, so that the solid reactant particles remove sulfur from the stack gas as it is formed in the fluidized combustion bed. In such cases, the combustion temperature can be maintained at or below 1500° F by conventional means such as addition of a diluent gas.

The stack gas or tail gas is preferably contacted with the solid reactant for about 3 minutes to about 60 minutes, preferably at a temperature in the range from about 1100° F to 1500° F, to react sulfur trioxide, or sulfur dioxide and oxygen, with reactive alumina as a component of the solid reactant to form a solid, sulfur-containing compound in the reactant particles. The sulfur-depleted stack gas is then separated from the sulfur-containing solid reactant particles and can then be further utilized in a conventional manner, as in steam generation.

After stack gas desulfurization use, the solid reactant particles contain a solid sulfur compound component. The solid reactant particles are contacted with a hydrocarbon to remove the sulfur component therefrom. The sulfur component is released from the particles as a relatively concentrated stream of hydrogen sulfide, and possibly one or more other gaseous or liquid sulfur compounds.

The hydrocarbon utilized to regenerate the solid reactant in embodiments of the invention used in desulfurization of stack gases may suitably be one or more $C_6+$ hydrocarbons, such a light or heavy hydrocarbon fraction or stream found in a petroleum refinery. Preferably, the hydrocarbon employed in the solid reactant regeneration step is a relatively heavy hydrocarbon fraction, for example, a fraction having an initial boiling point of 600° F or higher. Heavy residual fractions, such as vacuum residua, may suitably be used.

Means are provided for contacting solid reactant particles having a solid sulfur compound component therein with the hydrocarbon. The solid reactant particles may be employed in the form of a fixed bed, or as a moving bed or a fluidized bed, with contact between the particles and the hydrocarbon being undertaken in cocurrent flow, countercurrent flow, or a combination thereof. Preferably, the solid reactant is treated by passing a fluid stream of the hydrocarbon upwardly through a fluidized, dilute-phase or dense-phase bed of the sulfur compound-containing solid reactant.

The stream of hydrocarbon is preferably contacted with the sulfur compound-containing solid reactant in a suitable vessel or other container for about 5 seconds to about 5 minutes, at a temperature between 800° F and 1300° F, preferably 900° F to 1200° F, to react the sulfur and alumina-containing compound with components present in the hydrocarbon stream to form hydrogen sulfide and possibly other fluid sulfur compounds. This hydrogen sulfide is released into the hydrocarbon stream, and the resulting mixture of fluid hydrocarbons and hydrogen sulfide is then separated from the regenerated solid reactant particles, as by using one or more cyclone separators or like conventional separation means.

After the hydrocarbon and hydrogen sulfide-containing stream resulting from the regeneration step has been separated from the regenerated solid reactant particles, the stream can be cooled and then directed to a hydrogen sulfide recovery system, after which the sweetened hydrocarbons may be used as fuel for steam generation. The regenerated solid reactant particles are returned to stack gas desulfurization use after the regeneration step.

In one embodiment of stack gas desulfurization, the desulfurization step and solid reactant regeneration step of the process are performed in a desulfurization zone and a separate solid reactant regeneration zone. In such cases, the desulfurization zone may suitably be a container or reaction vessel capable of holding a fixed or moving bed of solid reactant particles and including means for contacting the reactant bed with a stream of sulfur oxides-containing stack gas at a temperature of 1000°–1500° F. Likewise, the solid reactant regeneration zone in such an embodiment may suitably be a container or a reaction vessel capable of holding a fixed or moving bed of the sulfur compound containing solid reactant particles, including means for contacting the sulfur compound-containing reactant bed with a stream of regenerant hydrocarbon at a temperature of 800°–1300° F.

In another embodiment, the desulfurization step and the solid reactant regeneration step of the process are both performed in a single suitable vessel or other container such as a reaction chamber capable of holding a fixed or fluidized bed of solid reactant particles therein. In such cases, at least two separate fixed beds of solid reactants are preferably used. At any given time, while a first solid reactant bed is preferably being employed to desulfurize a stream of sulfur-containing stack gas at a temperature of 1000°–1500° F in one chamber, a second solid reactant bed is simultaneously being regenerated by passing through it a regenerant stream of hydrocarbon at a temperature of 800°–1300° F. When the capacity of the first solid reactant bed for desulfurization of the stack gas is substantially used up by reaction of all the reactive alumina, and the second solid reactant bed has been substantially regenerated and the resulting hydrogen sulfide withdrawn, the first bed is then subjected to the regeneration operation by shutting off stack gas flow through it and passing the regenerant hydrocarbon stream through it at 800°–1300° F. At the same time, flow of regenerant hydrocarbon through the second bed is shut off and the second bed is utilized to desulfurize the stack gas stream at 1000° F to 1500° F by simply switching the flow of stack gas from the first solid reactant bed to the second bed, as in a swing bed operation.

The following illustrative embodiment is a preferred embodiment of the present invention for use in desulfurizing a stack gas stream produced by combustion of a sulfur-containing hydrocarbonaceous fuel.

ILLUSTRATIVE EMBODIMENT III

Coal containing 2.5 weight percent sulfur is burned in a utility boiler in an electricity generating plant sized to provide 100 megawatts. The stack gas mixture resulting from the combustion of the coal contains 0.2 volume percent sulfur oxides, 2 percent oxygen, 15 percent carbon dioxide, and 6 percent steam, the the rest of the gas being primarily nitrogen. The stack gas is removed from the combustion chambers of the utility boiler at a temperature of 2000° F and is passed through stream generation coils to reduce its temperature to 1200° F. The stack gas is then desulfurized in a stack gas desulfurization system identical to that shown in FIG. 2 and described above. The stack gas is fed through the conduit 20 into the desulfurization zone 21 at the rate of 12,000,000 cubic feet per hour. Sulfur compounds are passed into the desulfurization zone 21 in the stack gas at the rate of 2140 pounds per hour of sulfur, or 2000 ppm of sulfur oxides. In the desulfurization zone 21, the stack gas is contacted with a fluidized bed of alumina solid reactant particles containing 1.7 weight percent reactive alumina. The volume hourly space velocity of the stack gas in the fluidized bed is 5000 per hour. The residence time for the solid reactant particles in the desulfurization zone is 38–40 minutes. The temperature of the stack gas and solid reactant particles in the desulfurization zone is 1200° F. The pressure of the stack gas is 0.4 psig. Treated, sulfur-depleted stack gas is removed from the desulfurization zone 21 via the conduit 22 and is withdrawn from the desulfurization system for further steam generation use. Solid reactant particles containing 1.3 weight percent sulfur in an aluminum and sulfur-containing compound such as aluminum sulfate, are removed from the desulfurization zone 21 through the conduit 23 at the rate of 169,000 pounds per hour, and are passed into the solid reactant regeneration zone 24. A regenerant hydrocarbon stream consisting of petroleum vacuum residuum having an initial boiling point of 1200° F is fed into the desulfurization system through the conduit 25 at the rate of 6680 pounds per hour. The regenerant hydrocarbon stream is sprayed into contact with a fluidized bed of the solid reactant particles in the solid reactant regeneration zone 24. The solid reactant particles are contacted with the regenerant hydrocarbon at a temperature of 950°–1050° F, a pressure of 0.2 psig, a hydrocarbon residence time of 5 seconds, and a particulate solid reactant residence time of 1 minute. Reaction between components of the regenerant hydrocarbon and the solid sulfur-containing compound in the reactant particles forms hydrogen sulfide and the hydrogen sulfide is released into the hydrocarbon stream in the regeneration zone 24 at the rate of 2,030 pounds of sulfur per hour. The hydrocarbon stream is withdrawn from the system and, after cooling, may be passed, if desired, to hydrogen sulfide recovery facilities. Regenerated solid reactant particles are withdrawn from the solid reactant regeneration zone 24 through the conduit 27 at the rate of 167,000 pounds per hour and are recycled to the desulfurization zone 21 for further desulfurization use.

Preferred embodiments of the present invention for removing sulfur oxides from regenerator flue gas in an FCC system, and converting sulfur oxides in the regenerator gas to hydrogen sulfide withdrawn from the FCC reactor in the reactor off-gas, having been described, and a preferred embodiment of the invention for desulfurization of stack gas and tail gas mixtures having been described, the broad scope of the present invention will be apparent to those skilled in the art. It will be further apparent to those skilled in the art that the present invention provides an economical and convenient method for removing sulfur oxides from gases prior to discharging the gases into the atmosphere. The invention thus provides an improved method for reducing atmospheric pollution.

What is claimed is:

1. In a fluid catalyst cracking process including the steps of (a) cracking a sulfur-containing hydrocarbon stream in contact with a fluidized bed of a particulate cracking catalyst in a cracking zone at cracking conditions including a temperature in the range from 800° F to 1300° F, whereby sulfur-containing coke is deposited on said catalyst, and removing the hydrocarbon stream from said cracking zone; (b) passing coke-containing catalyst from said cracking zone and an oxygen-containing gas into a cracking catalyst regeneration zone, burning off said sulfur-containing coke therein at a temperature in the range from 1000° F to 1500° F to form a flue gas containing sulfur oxides, and removing said flue gas from said catalyst regeneration zone; and (c) returning the resulting coke-depleted catalyst from said catalyst regeneration zone to contact with said hydrocarbon stream in said cracking zone; the method for decreasing the amount of sulfur oxides in said flue gas which comprises the steps of:

1. reacting sulfur oxides in said flue gas with reactive alumina contained in a particulate solid other than said catalyst, the particulate solid being physically admixed with said particulate catalyst, in said regeneration zone to form at least one solid compound including sulfur atoms and aluminum atoms in said particulate solid, and removing said flue gas from said regeneration zone; and
2. forming hydrogen sulfide from said solid compound and said hydrocarbon stream by contacting said particulate solid with said hydrocarbon stream in said cracking zone in physical admixture with said particulate cracking catalyst, and removing hydrogen sulfide from said cracking zone in said hydrocarbon stream.

* * * * *